(12) United States Patent  
Nakashima et al.

(10) Patent No.: US 9,384,900 B2
(45) Date of Patent: Jul. 5, 2016

(54) ELECTRONIC COMPONENT AND MANUFACTURING METHOD THEREOF

(71) Applicant: FUJITSU LIMITED, Kawasaki-shi, Kanagawa (JP)

(72) Inventors: Tomokazu Nakashima, Kawasaki (JP); Masayuki Itoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 14/185,977

(22) Filed: Feb. 21, 2014

(65) Prior Publication Data

US 2014/0168860 A1  Jun. 19, 2014

Related U.S. Application Data

(63) Continuation of application No. PCT/JP2011/069345, filed on Aug. 26, 2011.

(51) Int. Cl.
*H01G 9/10* (2006.01)
*H01G 9/00* (2006.01)
*H01G 9/008* (2006.01)

(52) U.S. Cl.
CPC .............. *H01G 9/10* (2013.01); *H01G 9/008* (2013.01); *H01G 9/0029* (2013.01); *Y10T 29/417* (2015.01)

(58) Field of Classification Search
CPC ....... H01G 9/10; H01G 9/008; H01G 9/0029; Y10T 29/417
See application file for complete search history.

(56) References Cited

U.S. PATENT DOCUMENTS

| 5,117,333 | A | | 5/1992 | Kakuma et al. | |
|---|---|---|---|---|---|
| 5,847,919 | A | * | 12/1998 | Shimizu | H01G 9/10 361/303 |
| 6,128,179 | A | * | 10/2000 | Morokuma | H01G 9/10 29/25.03 |
| 2006/0285275 | A1 | * | 12/2006 | Itoh | H01G 2/12 361/517 |
| 2008/0190647 | A1 | | 8/2008 | Itoh | |
| 2009/0323254 | A1 | * | 12/2009 | Yamane | H01G 9/008 361/520 |
| 2011/0157778 | A1 | * | 6/2011 | Fujimoto | H01G 9/008 361/531 |
| 2012/0236469 | A1 | * | 9/2012 | Takahara | H01G 9/10 361/518 |

FOREIGN PATENT DOCUMENTS

| JP | 01270214 A | * | 10/1989 |
|---|---|---|---|
| JP | 02-049124 U | | 4/1990 |
| JP | 05283302 A | * | 10/1993 |
| JP | 07-020911 U | | 5/1995 |
| JP | 07-183179 | | 7/1995 |

(Continued)

OTHER PUBLICATIONS

International Search Report, mailed in connection with PCT/JP2011/069345 and mailed Nov. 15, 2011.

(Continued)

*Primary Examiner* — David M Sinclair
(74) *Attorney, Agent, or Firm* — Fujitsu Patent Center

(57) ABSTRACT

An electronic component includes a metal case with an opening at one end, a metal foil placed in an internal space of the metal case, a packing made of an elastic material and fit into the opening of the metal case, the packing having a through-bore, a cap made of a foamed material and provided at an outer side of the packing, a conductive tab inserted in the through-bore of the packing and connected at one end to the metal foil in the internal space of the metal case, and a lead with a first end connected to another end of the conductive tab and a second end projecting externally from the metal case.

10 Claims, 8 Drawing Sheets

(56) References Cited

FOREIGN PATENT DOCUMENTS

| | | |
|---|---|---|
| JP | 08-138982 | 5/1996 |
| JP | 09-129518 | 5/1997 |
| JP | 2007-273928 A | 10/2007 |
| JP | 2008-251982 A | 10/2008 |
| JP | 2010-003811 | 1/2010 |
| JP | 2010-161277 | 7/2010 |
| WO | 2007-043181 | 4/2007 |
| WO | WO 2008038808 A1 * | 4/2008 ............... H01G 9/10 |

OTHER PUBLICATIONS

Japanese Office Action mailed on Jul. 21, 2015 for corresponding Japanese Patent Application No. 2013-530893, with Partial English Translation, 4 pages.

Japanese Office Action mailed on Jan. 19, 2016 for corresponding Japanese Patent Application No. 2013-530893, with Partial English Translation, 4 pages.

* cited by examiner

ELECTRONIC COMPONENT AND MANUFACTURING METHOD THEREOF

CROSS REFERENCE TO RELATED APPLICATIONS

This application is a continuation application filed under 35 U.S.C. 111(a) and claims benefit under 35 U.S.C. 120 and 365(c) of PCT International Application No. PCT/JP2011/069345 filed on Aug. 26, 2011 and designating the United States, which application is incorporated herein by reference in its entirety.

FIELD

The embodiments discussed herein are related to an electronic component and a manufacturing method thereof.

BACKGROUND

In a semiconductor device, an electronic component such as a capacitor is used together with an integrated circuit device. An electrolytic capacitor is a large-capacitance capacitor which is generally connected as a power supply source to a surrounding of a central processing unit (CPU) or a large-scale integrated circuit (LSIC). A typical structure for providing an electric connection to the electrodes of an electrolytic capacitor is to connect conductive tabs or conductive leads to the anodic metal (such as aluminum) foil and the cathodic metal foil that serve as internal electrodes of the electrolytic capacitor. The conductive tab or the conductive lead is connected to a lead wire which is a tin-plated copper wire or a copper-clad steel wire plated with tin. The conductive tab and the lead wire are joined to each other generally by electrical welding.

During the electrical welding, tin plating flakes fly and scatter from the lead wire and adhere on the welded part. The tin flakes solidified on the welded part constitute an uneven tin layer with non-uniform thickness and area size. Because a mechanical stress exists inherently in this uneven tin layer, tin whiskers grow from the surface of the tin layer. Whiskers are metal crystals of tin that have grown in needle-like shapes with a length of about 0.2 mm, and accordingly whiskers are conductive substances. When adequately grown whiskers drop off and scatter from the surface, such whiskers cause short-circuits between electrical terminals of other electronic components placed near the capacitor. This may further cause circuit defects.

The above-stated problem occurs in an arbitrary electronic component that involves a welding process of tin-plated lead terminals or lead wires. Lead wires may be treated by alkaline cleaning or high-temperature heating; however, such treatment is insufficient to effectively prevent whiskers. An easy solution for preventing scattering of whiskers is to physically cover the welded part. However, this solution may affect the reliability of the electronic components such as capacitors. Besides, the manufacturing cost and the price of the electronic component will increase due to the increased number of work processes and an extra part.

To prevent scattering of whiskers, a structure for providing a swelling to a part of the lead is known. See, for example, PCT International Publication No. WO 2007/043181 A1. When the lead is inserted in a through-bore for connection to a capacitor element, the swelling blocks the through-bore to prevent whiskers from scattering to the external space. This technique requires an additional step for forming the swelling during the fabrication of the lead wire.

Another known technique for preventing scattering of whiskers is to insert a sealing sheet between an electrolytic capacitor and a printed circuit board when mounting the electrolytic capacitor onto the printed circuit board in order to shut a through-hole formed to provide electrical connection to the capacitor element. See, for example, Japanese Patent Application Laid-open Publication No. 2010-3811. This method is only applicable to a vertical mounting structure for an electrolytic capacitor stuck onto a substrate.

Meanwhile, to prevent leakage of an electrolyte of an electrolytic capacitor, a fluoroplastic foam resin is provided to a caulked part of the seal packing of an electrolytic capacitor. See, for example, Japanese Utility Model Examined Publication No. H07-20911. To let gas produced in a capacitor cell out, an air-permeable sheet made of a porous plastic resin is used. See, for example, Japanese Patent Application Laid-open Publication No. H08-138982.

There is a demand for a simple structure and a simple process that can prevent scattering of whiskers produced in a welded part between a lead (or a tab) and a lead wire of an electronic component.

SUMMARY

According to an aspect of the embodiments, an electronic component includes a metal case with an opening at one end, a metal foil placed in an internal space of the metal case, a packing made of an elastic material and fit into the opening, the packing having a through-bore, a cap made of a foamed material and provided at an outer side of the packing, a conductive tab inserted in the through-bore of the packing and connected at one end to the metal foil in the internal space of the metal case, and a lead with a first end connected to the other end of the conductive tab and a second end projecting externally from the metal case.

According to another aspect of the embodiments, an electronic component manufacturing method is provided. The manufacturing method includes
  connecting a conductive tab welded to a lead to a metal foil to fabricate an element having the lead,
  inserting the lead of the element into a through-bore of an elastic packing,
  placing the element and the packing in a metal case from an opening provided at one end of the metal case,
  sealing the metal case at the opening with the packing and a cap, which cap is made of a foamed material and provided on the outer side of the packing, such that the lead extends to the exterior of the metal case.

The objects and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

The embodiments are described below with reference to the drawings.

Figure 1:
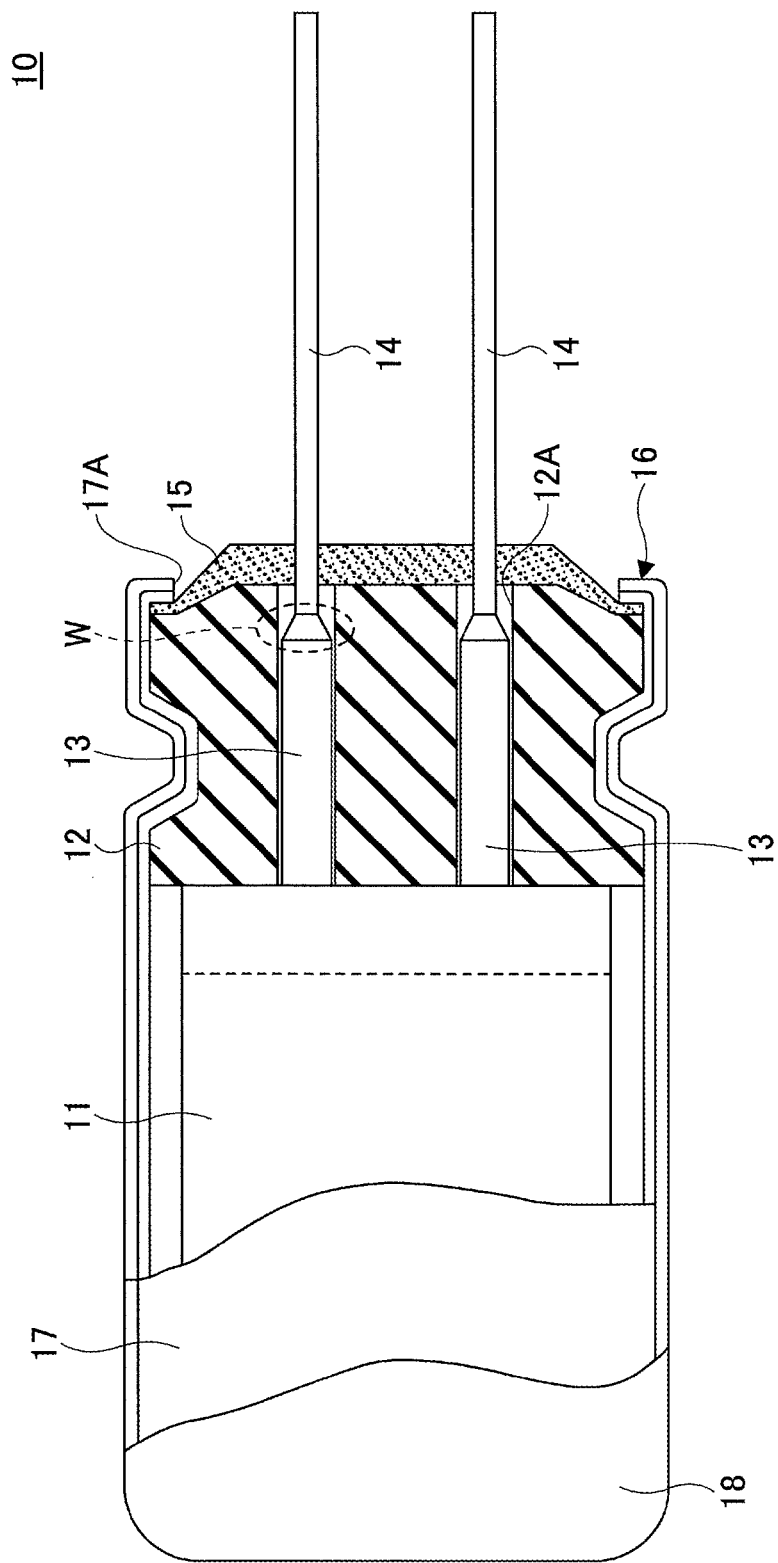
FIG. 1 is a schematic diagram of an electrolytic capacitor which is an example of an electronic component.

FIG. 1 is a schematic diagram of an electrolytic capacitor 10 according to an embedment. The electrolytic capacitor 10 has an aluminum case 17 with an aperture 17A at one end, a capacitor element 11 placed in the aluminum case 17, a packing 12 fit into the opening 17A of the aluminum case 17, and a cap 15 provided at the outer side of the packing 12. The packing 12 is made of an elastic material such as rubber from the viewpoint of preventing leakage of an electrolyte inside. The packing 12 has a though-bore 12A. The cap 15 is made of a foamed or porous material.

The electrolytic capacitor 10 also has a conductive tab 13 and a lead 14. The conductive tab 13 is inserted in the through-bore 12A of the packing 12 and connected at one end to the capacitor element 11. One end of the lead 14 is welded to the other end of the conductive tab 13, while the other end of the lead 14 is projecting externally from the aluminum case 17. The capacitor element 11 is formed of metal foils such as aluminum foils, which structure is described in more detail below. The conductive tab 13 is connected to the metal foil in the internal space of the aluminum case 17.

The packing 12 and the cap 15 are used to seal the opening 17A of the aluminum case 17. In the example illustrated in FIG. 1, the packing 12 and the cap 15 are integrally secured by crimping a peripheral rim 16 of the aluminum case 17.

Figure 2A:
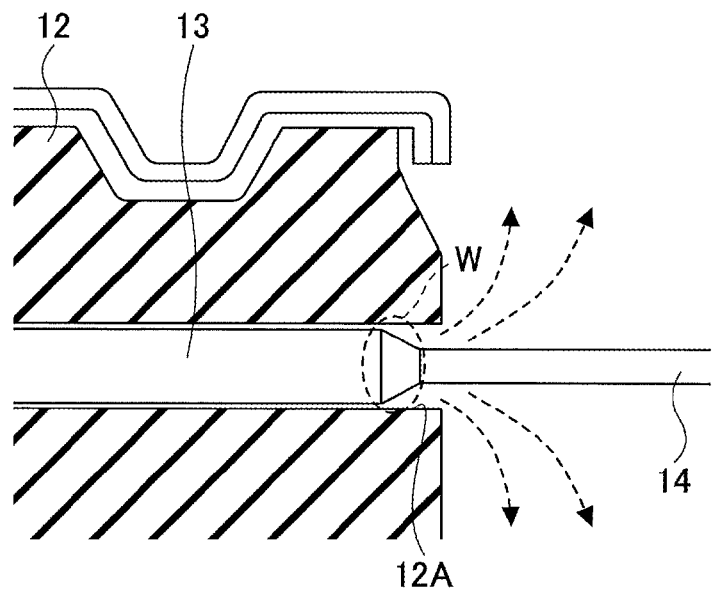
FIG. 2A illustrates an problem that may occur without a cap.

FIG. 2A through FIG. 2D illustrate how the cap 15 functions. The cap 15 can prevent scattering of whiskers produced at a welded part W between the conductive tab 13 and the lead 14. The cap 15 made of a foamed or soft porous material also absorbs or lets the gas generated inside the capacitor element 11 out. Without the cap 15, the whiskers having grown from the welded part W will drop off and scatter through the gap between the through-bore 12A and the welded part W out of the electrolytic capacitor 10, as illustrated in FIG. 2A.

Figure 2B:
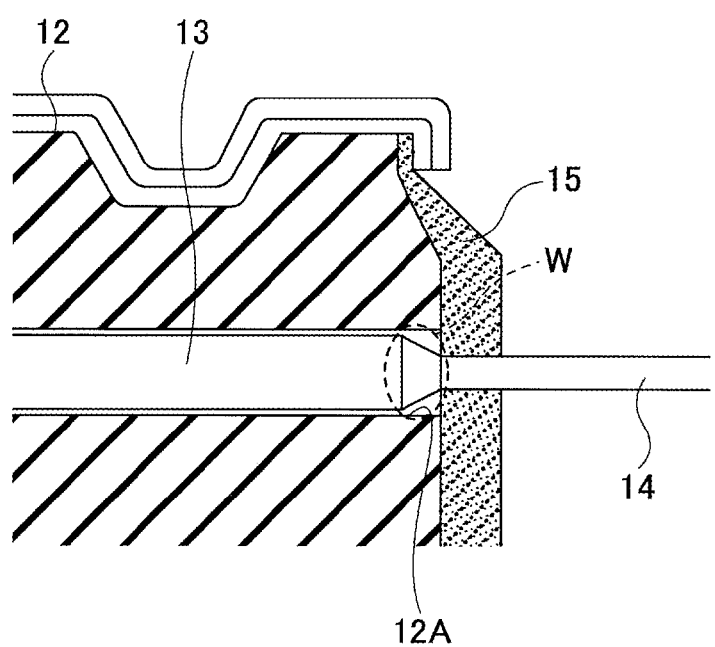
FIG. 2B illustrates an advantageous effect achieved by providing a cap.

To prevent the whiskers from scattering out of the electrolytic capacitor 10, the cap 15 is provided at the outer side of the packing 12, as illustrated in FIG. 2B. The space around the conductive tab 13 and/or the lead 14 is sealed up by the cap 15. Even if whiskers grow in and drop off from the welded part W, scattering of the whiskers to the external space can be prevented.

Figure 2C:
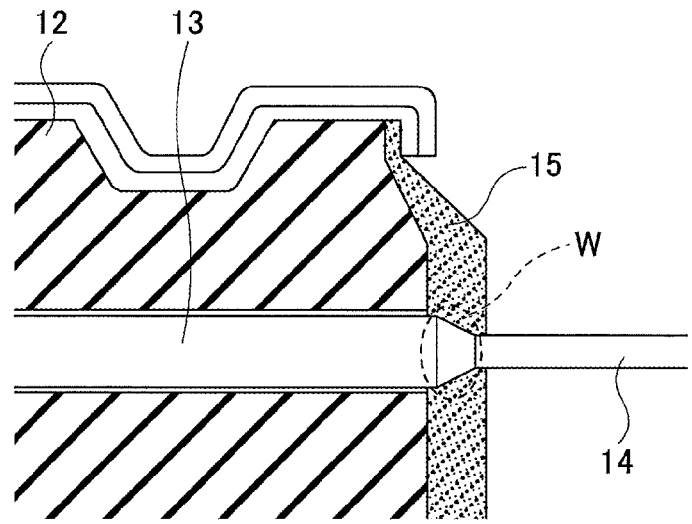
FIG. 2C illustrates a position of a joint between the conductive tab and a lead when a cap is provided.
Figure 2D:
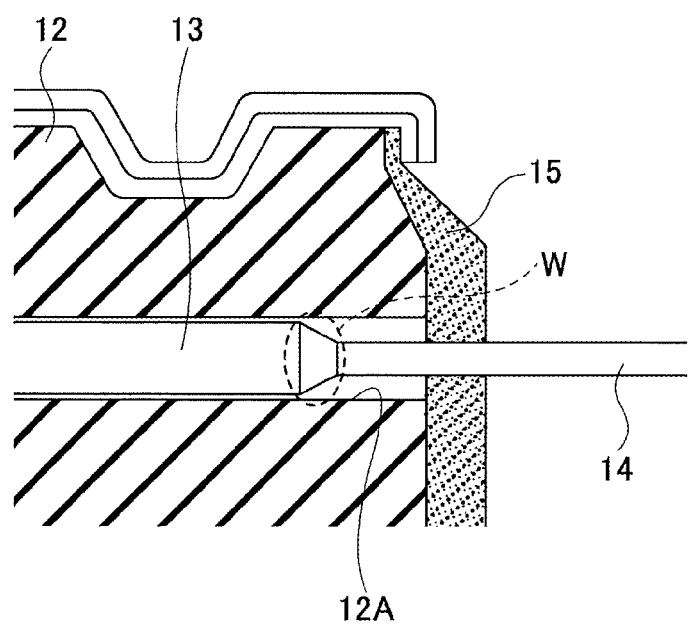
FIG. 2D illustrates a position of a joint between the conductive tab and a lead when a cap is provided.

The welded part W between the conductive tab 13 and the lead 14 may be set to an arbitrary position unless the welded part W goes out of the cap 15. For example, the welded part W may be positioned in the material of the cap 15 as illustrated in FIG. 2C. Alternatively, the welded part W may be positioned in the through-bore 12A of the packing 12 as illustrated in FIG. 2D. The configuration of FIG. 2C can prevent scattering of whiskers as in FIG. 2B. In the configuration of FIG. 2D, the space around the welded part W and the lead 14 serves as a whisker lock-in space. Flaking or scattering of whisker can be equally prevented by the configuration of FIG. 2B in which the welded part W is positioned at or in the vicinity of the boundary between the cap 15 and the packing 12.

The cap 15 is made of a non-conductive material, and especially, of a foamed or soft porous material such as sponge as has been described above. An air permeable cap 15 of a foam such as sponge 1.5 allows a gas (e.g., hydrogen gas) produced during the operation of the capacitor element 11 to escape from the electrolytic capacitor 10. Examples of the foamed or soft porous material include, but are not limited to, a foamed sponge material such as polyethylene foam, urethane foam, chloroprene rubber, fluorine-contained rubber, or silicon rubber, and a carbon-mixed elastomer. When using a foamed material that contains activated carbon, the gas produced by the capacitor element 11 can be absorbed.

The thickness and the density (or bubble fraction) of the cap 15 may be appropriately selected within ranges that can prevent external scattering of whiskers and absorb or let the gas produced from the capacitor element 11 out. Even if the length of whiskers ranges several tens microns to several hundred microns, while the diameters of bubbles are several tens microns, scattering of the whiskers can be prevented because the bubbles exist at random in the cap 15. Alternatively, a foam with fine bubbles with a diameter at or below 10 μm may be used. Perfect airtightness or water-tightness is not required, and independent or semi-independent foams may be used. However, highly air permeable materials or low density materials are less effective to prevent whisker scattering. From the view point of facilitating caulking of the cap 15 and the packing 12 by crimping the peripheral rim 16 of the aluminum case 17, a material with a low compressive load during deformation is preferable. Besides, since the temperature of the lead 14 reaches about 300° C. during the process of solder-mounting of the electronic component (such as electrolytic capacitor), it is preferable for the cap 15 to have a heat resistance so as not to deform at that temperature. For example, a urethane foam with a density of 20-70 kg/m$^3$ and a thickness of 2 mm may be used.

By providing the cap 15 over the packing 12, scattering of whiskers is prevented. Simultaneously, gas produced inside the capacitor element 11 can be absorbed or let out, and the internal pressure of the electrolytic capacitor 10 can be prevented from rising excessively high.

Figure 3:
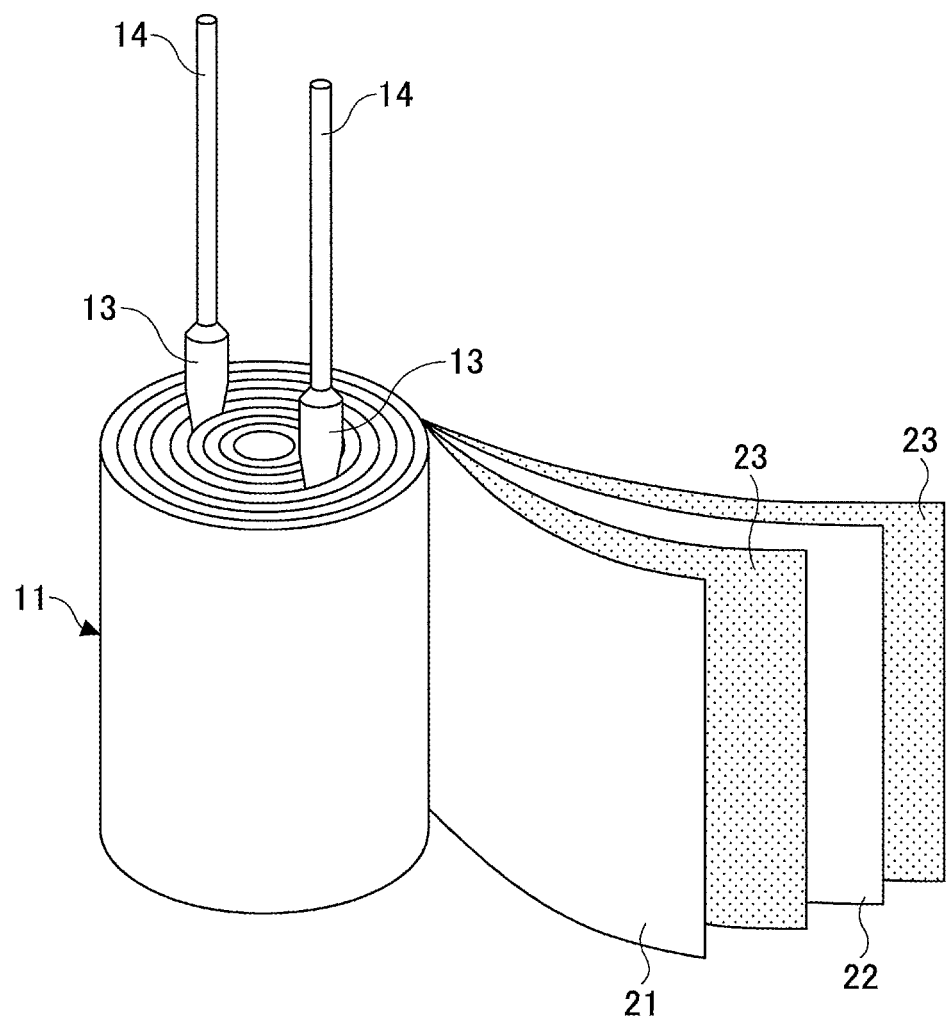
FIG. 3 illustrates a process of connecting a conductive tab to a capacitor element of an electrolytic capacitor.

FIG. 3 through FIG. 6 illustrate a fabrication process of the electrolytic capacitor 10 of FIG. 1. FIG. 3 illustrates how the conductive tab 13 and the lead 14 are connected to the capacitor element 11. In the example of FIG. 3, the capacitor element 11 is a roll of layers of an anodic metal foil strip 21 and a cathodic metal foil strip 22 with electrolytic paper 23 interleaved between them. The width of the anodic metal foil 21 and the cathodic metal foil 22 is, for example, 5 mm; however, an arbitrary size may be selected according to the electrostatic capacitance or other factors of the electronic component.

When the layers of the anodic metal foil 21, the electrolytic paper 23 and the cathodic metal foil 22 are rolled up, the roll is taped by, for example, a polypropylene tape. The anodic metal foil 21 and the cathodic metal foil 22 are, for example, aluminum foils. The electrolytic paper 23 serves as a separator or a spacer to prevent electrical short circuits between the anodic metal foil 21 and the cathodic metal foil 22. The electrolytic paper 23 is impregnated with and maintains an electrolyte.

Figure 4:
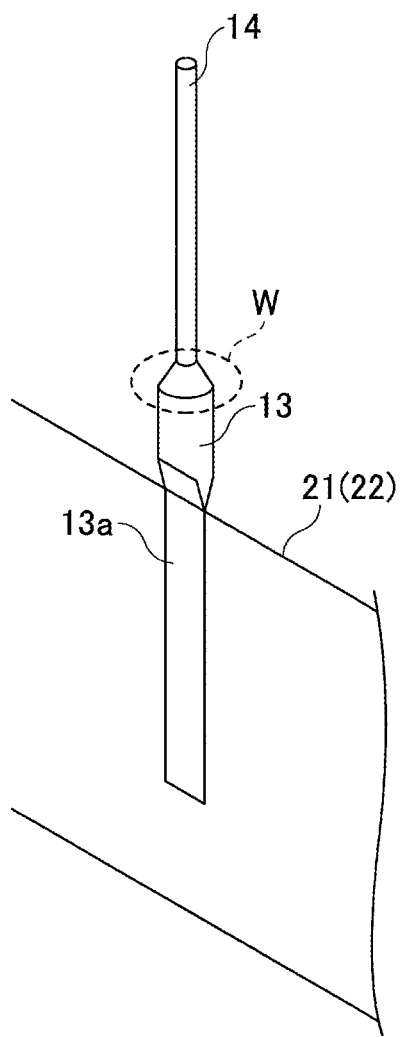
FIG. 4 illustrates a connecting state between the conductive tab and a metal foil of the capacitor element of FIG. 3.

During the fabrication of the roll of the capacitor element 11 of FIG. 3, the conductive tab 13 is connected to the capacitor element 11. FIG. 4 illustrates how the conductive tab 13 is connected to the aluminum foil (the anodic metal foil 21 or the cathodic metal foil 22). A lead 14 is welded to the conductive tab 13 in advance. The lead 14 is, for example, a copper-clad steel wire whose surface is tinned. The conductive tab 13 has a flat end portion 13a at the opposite end of the welded part for the connection to the lead 14. The flat end portion 13a is connected to the surface of the aluminum foil 21 or 22 using an arbitrary technique. For example, ultrasonic compression bonding may be used. Alternatively, the flat end portion 13a of the conductive tab 13 and the aluminum foil 21 (or 22) may be punched together and clamped to each other (the clamped part is not illustrated in the figure).

After the fabrication of the capacitor element 11 by creating a roll of the layers of the aluminum foils 21 and 22 interleaved with the electrolytic paper 23 (serving as a separator) as illustrated in FIG. 3, the capacitor element 11 is impregnated with an electrolyte. The gap between the aluminum foils 21 and 22 is filled with the electrolyte and the electrolyte paper 23 is impregnated with the electrolyte.

Figure 5:
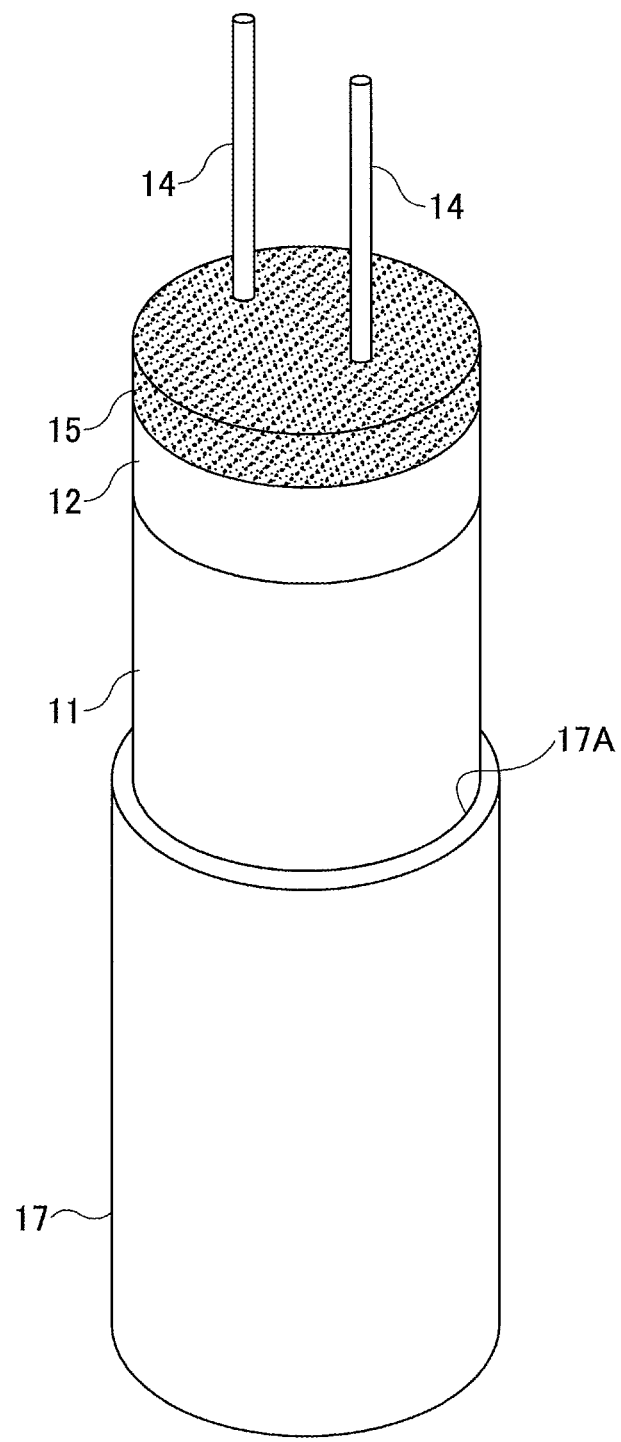
FIG. 5 illustrates insertion of a packing and a cap into a metal case.

Then, as illustrated in FIG. 5, the capacitor element 11 impregnated with the electrolyte is placed in the aluminum case 17. When placing the capacitor element 11 in the internal space of the aluminum case 17, the lead 14 is inserted in the through-bore 12A (see FIG. 1) of the packing 12, and the packing 12 and the capacitor element 11 are inserted into the opening 17A of the aluminum case 17. The cap 15 is provided to cover the outer face of the packing 12, while letting the leads 14 project externally. Because the cap 15 is made of a foamed material, the leads 14 can penetrate through the cap 15 without forming through-holes.

The assemble process of FIG. 5 may be carried out in no particular order as long as the opening 17A of the aluminum case 17 is hermetically sealed with the packing 12 and the cap 15 provided at the outer face of the packing 12 with the lead 14 pulled out of the aluminum case 17. For example, the lead 14 connected to the capacitor element 11 may be inserted in the through-bore 12A of the packing 12 and then the packing 12 is covered with the cap 15 before the insertion of the capacitor element 11 into the aluminum case 17. Alternatively, the capacitor element 11 with the lead 14 inserted in the through-bore 12A of the packing 12 is placed in the aluminum case 17, and then the cap 15 is provided onto the packing 12.

Figure 6:
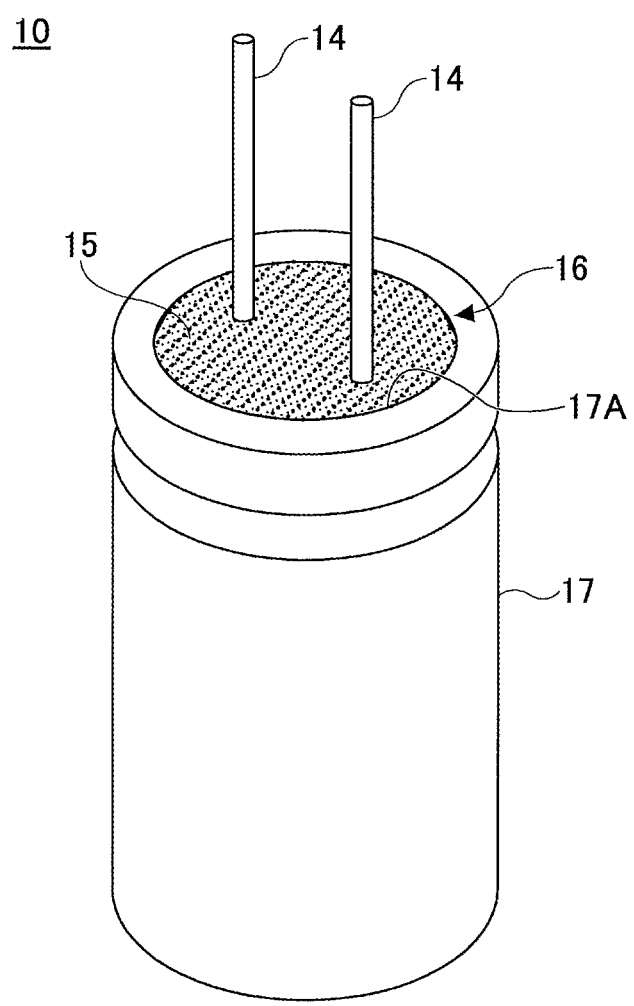
FIG. 6 illustrates a caulked state in which the peripheral rim of the metal case is crimped to integrally secure the cap and the packing.

Then, as illustrated in FIG. 6, the peripheral rim 16 of the aluminum case 17 is crimped to integrally caulk and secure the packing 12 and the cap 15. Thus, the electrolytic capacitor 10 is completed. The assembled unit may be covered with an outer sleeve 18 (see FIG. 1) as necessary. The outer sleeve 18 is formed of an arbitrary material such as polyester (PET) or another resin.

Figure 7:
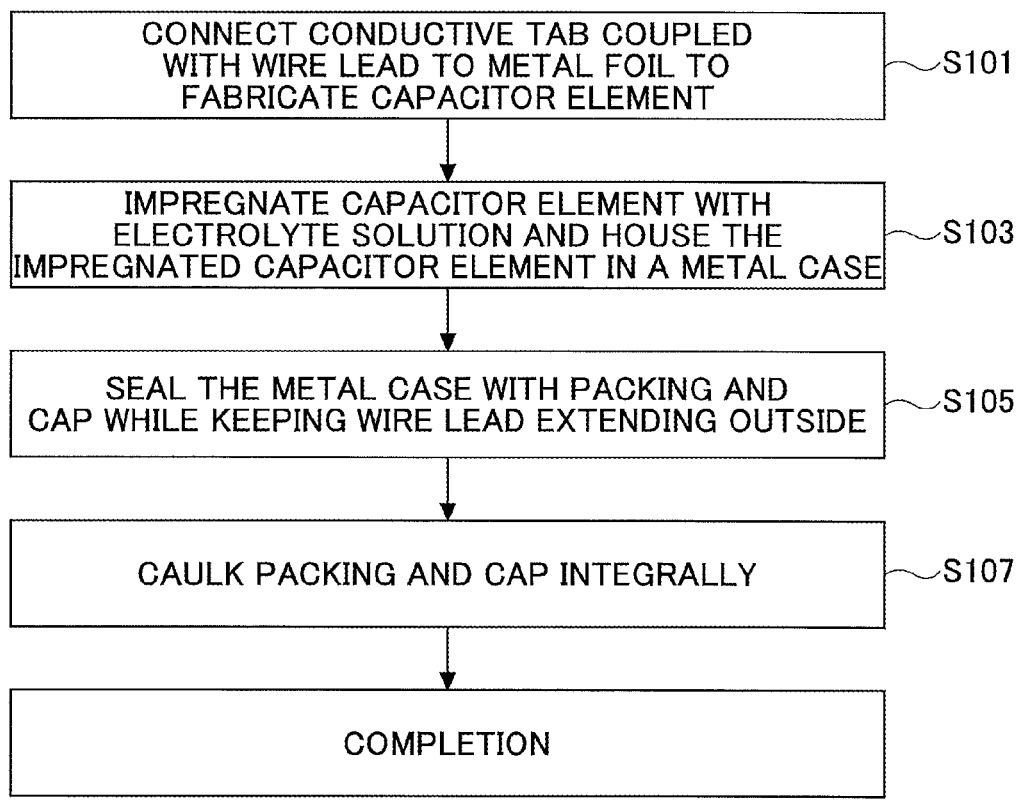
FIG. 7 is a flowchart illustrating a manufacturing process of the electrolytic capacitor according to an embodiment.

FIG. 7 illustrates a manufacturing flow of the electrolytic capacitor according to an embodiment. First, a capacitor element 11 is fabricated by connecting one end of the conductive tab 13 to the metal foil (aluminum foil, for example) 21 or 22 (step S101). The other end of the conductive tab 13 is welded in advance to the lead 14. Then, the capacitor element 11 is impregnated with an electrolyte, and the impregnated capacitor element 11 is placed in a metal case such as an aluminum case (step S103). Then, the opening 17A of the metal case 17 is sealed by the packing 12 and the cap 15, while pulling the lead 14 externally from the cap 15. (step S105). In this step, the packing 12 and the cap 15 are fit into the opening 17A such that the welded part W between the lead 14 and the conductive tab 13 is not exposed to the exterior of the cap 15.

Steps S103 and S105 are not necessarily performed in this order because these steps are not separated from each other. The cap 15 may be provided over the packing 12 with the lead 14 penetrating through the cap 15 upon the impregnation of the capacitor element 11 with the electrolyte. Then the capacitor element 11 capped with the cap 15 may be inserted in the metal case 17 to seal the meal case with the packing 12 and the cap 15.

Finally, the peripheral rim 16 of the metal case 17 is crimped to integrally caulk and secure the packing 12 and the cap 15 (step S107). Thus, the electrolytic capacitor 10 is completed.

The above-described structure and fabrication method are not limited to fabrication of an electrolytic capacitor, but also applicable to an arbitrary electronic component with a lead or a tab (terminal) from which whiskers may grow.

The structure and the manufacturing method have advantageous effects presented below.

(a) An electrolytic capacitor 10 that can prevent scattering of whiskers is realized.

(b) Common and standard types of materials are used for the packing or the lead, and an electrolytic capacitor can be fabricated without using special-purpose items.

(c) Because the foamed material (cap) is secured simultaneously with the caulking of the packing, no additional caulking process is required. The foamed material used for the cap is flattened in a very thin state by compression during the caulking, so the cap can be secured at an ordinary crimping process. When the electrolytic capacitor is mounted on a printed circuit board, the size of the component can be maintained without increasing the height.

(d) Because the foamed material of the cap is air permeable, a gas produced inside the case during the performance or the operation of the component can be let out of the component.

(e) Because the foamed material of the cap does not have chemical influence on the packing or the internal electrolyte, degradation of the capacitor can be prevented.

(f) Because the foamed material of the cap is flexible, little stress is applied to the capacitor element when the electrolytic capacitor is inserted in an opening of an outer sleeve. Even if there is a little positional offset, the whisker prevention effect can be maintained.

(g) Because the capacitor element and the combination of the packing and the cap are integrated into a single unit, the electrolytic capacitor can be mounted laterally or horizontally with respect to a printed circuit board, as well as vertically mounted with respect to the printed circuit board. In either case, a whisker prevention effect is equally achieved.

(h) Short circuits or other problems due to whiskers scattered from a capacitor can be reduced in a power supply circuit or a CPU circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

The invention claimed is:
1. An electronic component comprising:
a metal case with an opening at one end;
a metal foil placed in an internal space of the metal case;
a packing made of an elastic material and fit into the opening of the metal case, the packing having a through-bore, a cap made of a foamed material and provided at an outer side of the packing, wherein the cap is provided outside the metal case and has a thickness and a density that prevent external scattering of whiskers and that absorb or discharge a gas produced from a capacitor element inside the metal case;

a conductive tab inserted in the through-bore of the packing and connected at one end to the metal foil in the internal space of the metal case; and a lead with a first end connected to another end of the conductive tab and a second end projecting externally from the metal case.

2. The electronic component according to claim 1, wherein the cap is made of a sponge-like non-conductive material.

3. The electronic component according to claim 2, wherein the cap contains activated carbon.

4. The electronic component according to claim 3, wherein the lead is welded to the conductive tab.

5. The electronic component according to claim 4, wherein the first end of the lead is welded to said other end of the conductive tab, and a welded part between the conductive tab and the lead is positioned so as not to be exposed outside the cap.

6. The electronic component according to claim 4, wherein the first end of the lead is welded to said other end of the conductive tab, and a welded part between the conductive tab and the lead is positioned inside the through-bore of the packing.

7. The electronic component according to claim 4, wherein the first end of the lead is welded to said other end of the conductive tab, and a welded part between the conductive tab and the lead is positioned at or near a boundary between the packing and the cap.

8. The electronic component according to claim 1, wherein the cap and the packing are integrally caulked by a peripheral rim of the metal case and secured to the opening of the metal case.

9. A manufacturing method of an electronic component, comprising:

connecting a conductive tab welded to a lead to a metal foil to fabricate an element having the lead;

inserting the lead of the element into a through-bore of an elastic packing;

placing the element and the packing in a metal case from an opening provided at one end of the metal case; and sealing the metal case at the opening with the packing and a cap, the cap being made of a foamed material and provided on an outer side of the packing, such that the lead extends to the external of the metal case, wherein the cap is provided outside the metal case and has a thickness and a density that prevent external scattering of whiskers and that absorb or discharge a pas produced from a capacitor element inside the metal case.

10. The method according to claim 9, further comprising:

crimping a peripheral rim of the metal case to integrally caulk the packing and the cap.

\* \* \* \* \*